D. W. SNYDER.
MACHINE FOR MAKING PAPER BAGS.
APPLICATION FILED FEB. 26, 1916.

1,265,270.

Patented May 7, 1918.
9 SHEETS—SHEET 1.

D. W. SNYDER.
MACHINE FOR MAKING PAPER BAGS.
APPLICATION FILED FEB. 26, 1916.

1,265,270.

Patented May 7, 1918.
9 SHEETS—SHEET 2.

Witnesses:
Leo J. Dubois.

Inventor
David W. Snyder
By Rudolph Wm. Lotz
Atty.

D. W. SNYDER.
MACHINE FOR MAKING PAPER BAGS.
APPLICATION FILED FEB. 26, 1916.

1,265,270.

Patented May 7, 1918.
9 SHEETS—SHEET 4.

D. W. SNYDER.
MACHINE FOR MAKING PAPER BAGS.
APPLICATION FILED FEB. 26, 1916.

1,265,270.

Patented May 7, 1918.
9 SHEETS—SHEET 5.

Inventor
David W. Snyder

D. W. SNYDER.
MACHINE FOR MAKING PAPER BAGS.
APPLICATION FILED FEB. 26, 1916.

1,265,270.

Patented May 7, 1918.
9 SHEETS—SHEET 7.

UNITED STATES PATENT OFFICE.

DAVID W. SNYDER, OF CHICAGO, ILLINOIS.

MACHINE FOR MAKING PAPER BAGS.

1,265,270.

Specification of Letters Patent.

Patented May 7, 1918.

Application filed February 26, 1916. Serial No. 80,729.

*To all whom it may concern:*

Be it known that I, DAVID W. SNYDER, citizen of the United States, residing at Chicago, in the county of Cook and State of Illinois, have invented certain new and useful Improvements in Machines for Making Paper Bags; and I do hereby declare the following to be a full, clear, and exact description of the invention, such as will enable others skilled in the art to which it appertains to make and use the same.

This invention relates to improvements in paper bag-making machines, and has for its particular object to provide a machine which will produce paper bags from a web without wasting a particle of paper, and which will produce such bags with great rapidity, and at very small cost for labor and material.

A further object of the invention is to provide a machine of the character defined which is easily and quickly adjustable and is provided with interchangeable parts for producing a very large number of different sizes of bags, varying both as to length and width.

Other objects of the invention relate more particularly to specific features of construction and mechanical combinations whereby the objects of the invention are attained as will appear more particularly from the following specification.

In the accompanying drawings illustrating suitable embodiments of the invention:

Figure —1— is a fragmentary detail view in elevation showing how a web of paper is formed into a tube and cut into bag blanks from which the completed paper bags are made.

Fig. —2— is a perspective view of a completed bag made from the blank shown in Fig. —1—.

Fig. —3— is a view in side elevation of a bag-making machine constructed in accordance with my invention.

Fig. —4— is a top plan view of the same.

Fig. —5— is a detail vertical transverse section on the line 5—5 of Fig. —3—.

Fig. —6— is a side elevation looking at the opposite side of the machine from that shown in Fig. —3—.

Fig. —7— is a detail vertical longitudinal section of the machine on the line 7—7 of Fig. —4—.

Figs. —8— and —9— are fragmentary detail vertical longitudinal sections on the lines 8—8 and 9—9 respectively, of Fig. —4— on an enlarged scale.

Fig. —10— is a fragmentary detail vertical longitudinal section on the line 10—10 of Fig. —4—.

Fig. —11— is a fragmentary detail vertical transverse section on the line 11—11 of Fig. —10—.

Fig. —12— is a fragmentary detail transverse section on the line 12—12 of Fig. —4—, showing the plate or shoe over which the tubular bag blanks are formed.

Fig. —13— is a detail perspective view of an extension rail employed to widen the structure shown in Fig. —12—.

Figs. —14— and —15— are views in elevation of respectively opposite sides of a cutting bed employed in connection with severing knives for cutting the tube into bag blanks.

Fig. —16— is a view in elevation of roller-carrying cutter knives for cutting a paper tube into bag blanks.

Fig. —17— is a section of the same on the line 17—17 of Fig. —16—.

Fig. —18— is a detail section of an interchangeable cutter block adapted to be mounted on the roller shown in Figs. —16— and —17—.

Figs. —19— and —20— are fragmentary views in elevation of cutter knives employed.

Fig. —21— is a view similar to Fig. —18— of another cutting block employed and constituting a companion block for the block shown in Fig. —18—.

Fig. —22— is a perspective view of a paper bag differing somewhat from the bag shown in Fig. —1—.

Fig. —23— is a fragmentary view in side elevation of a machine for producing the bag shown in Fig. —22—.

Figures 1, 2:
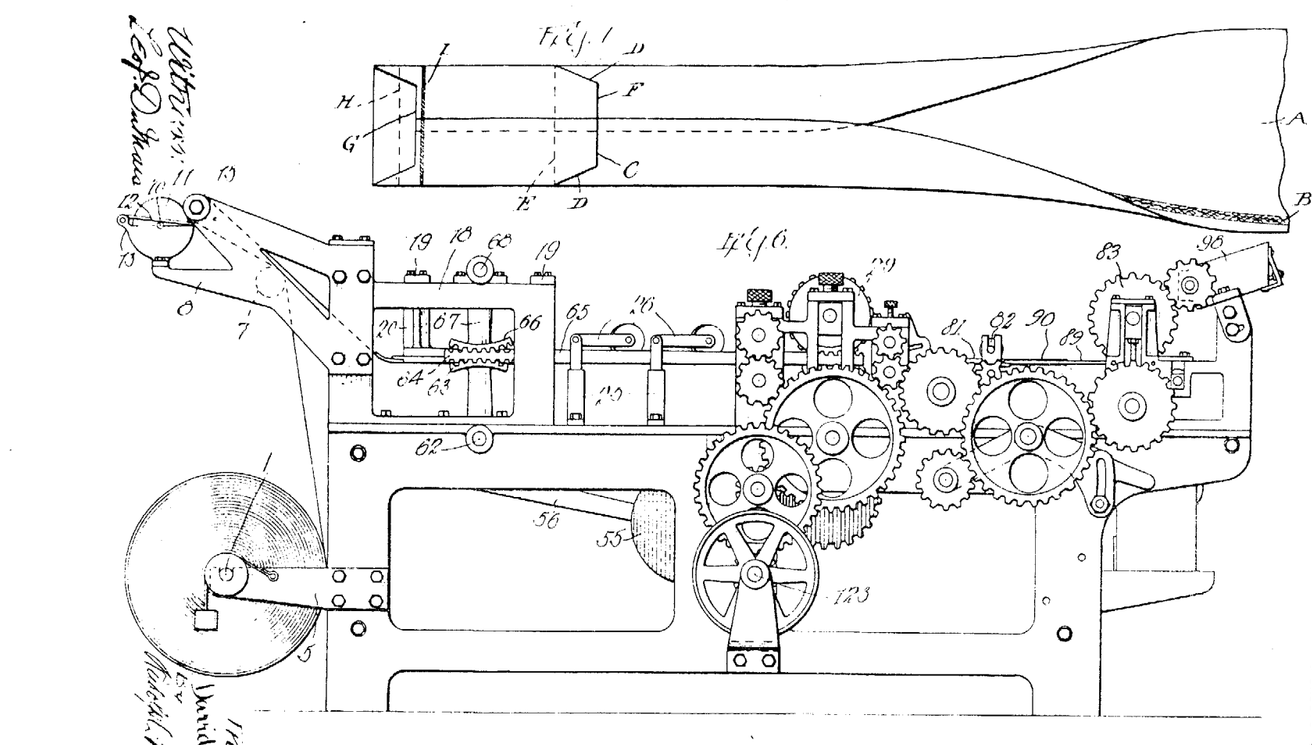
Figure 3:
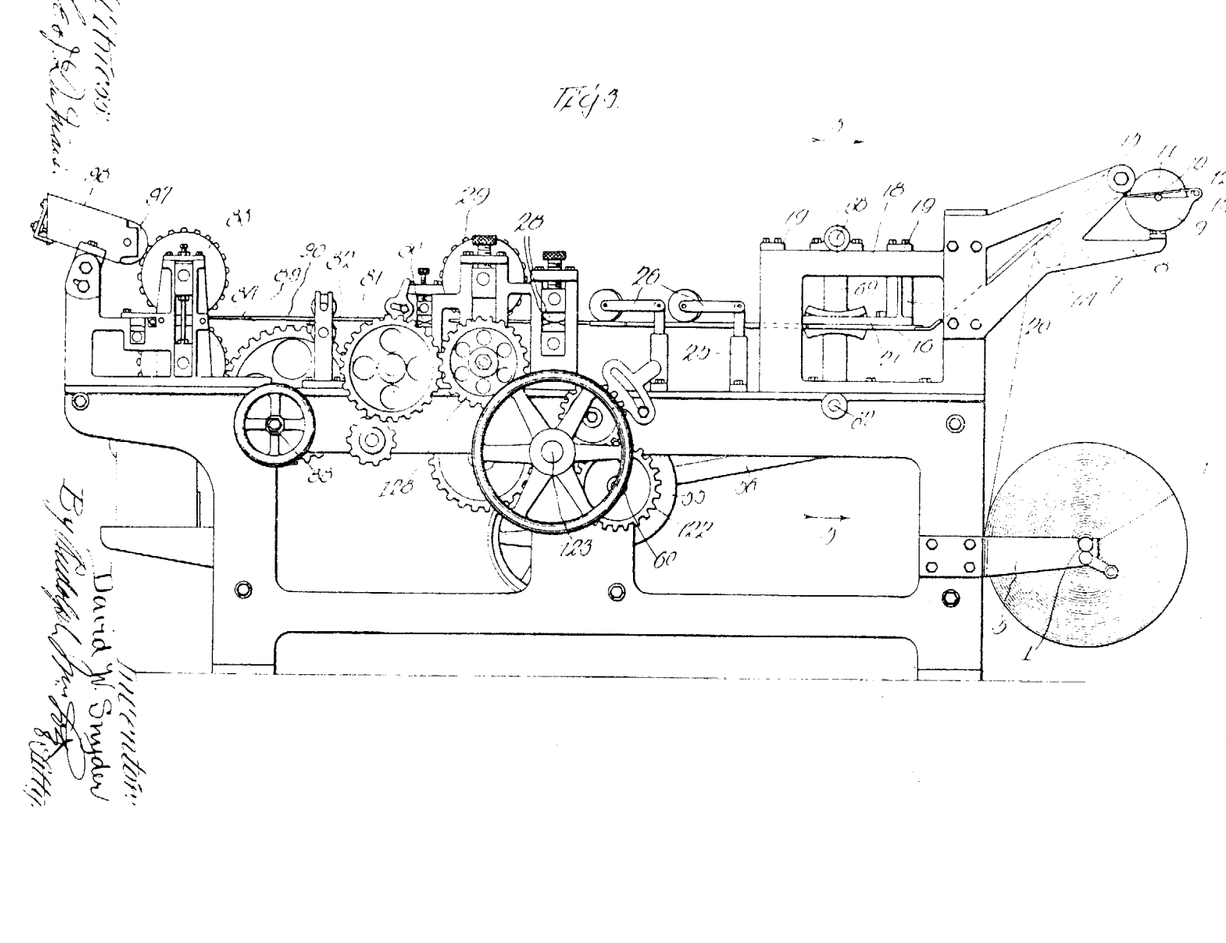

In order that the operation of the machine may be most readily understood, I have in Fig. —1—, illustrated the web of paper from which the bag is made, showing how the same is first folded to produce a flat tube, and how this tube is cut into lengths to provide bag-blanks. Thus, the web A of paper has adhesive applied to it contiguous to one side edge thereof as at B. This web is then folded by turning the side edge portions over upon the middle portion so that said edge portions overlap and said strip B of adhesive material becomes disposed between said overlapped edge-portions and secures the same together, thus completing a flat tube. This tube is then cut at intervals to form bag-blanks by severing one of the flat walls thereof along a transverse line C terminating at points considerably removed from the folded side edges of the tube, and along the divergent lines D extending from the ends of the line C to said folded side edges of the tube. The other wall of the latter is severed along a transverse line E extending the entire width of the tube and meeting the last-named ends of the lines D. Thus the bag blank is provided with a tongue F at the end of one wall which projects beyond the contiguous end of the other wall. At its other end the first-named wall is provided with a recess G of the shape and dimensions of said tongue F. To complete the bag, the blank is folded on the dotted line H intersecting the recess G so that the other or rectangular wall of the blank will overlap the tongued and recessed wall contiguous to the recess G therein. A strip I of adhesive is applied to the outer face of the last-named wall and this is overlapped by the folded-over portion of the other wall which is thus secured and provides a tight bottom for the bag, the completed bag being shown in Fig. —2—.

Fig. —2— illustrates the preferred construction of bag produced and I have, therefore, in Figs. —3— to —21— inclusive, illustrated the machine constructed to produce this bag in which, it will be noted, the longitudinally overlapped edges of the blank form the tongued and recessed wall.

Figure 22:
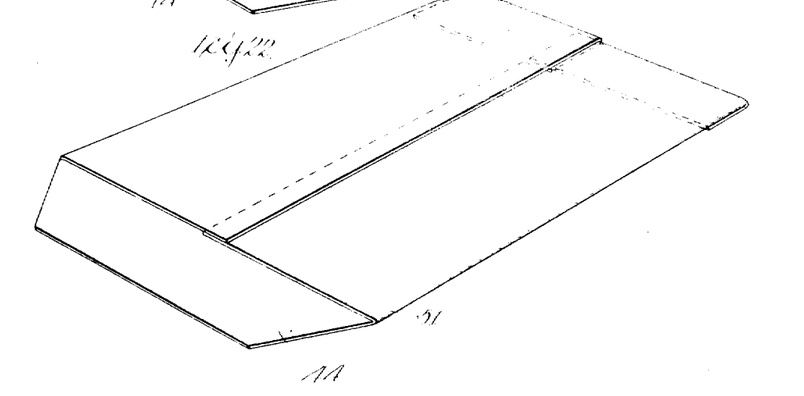
Figure 23:
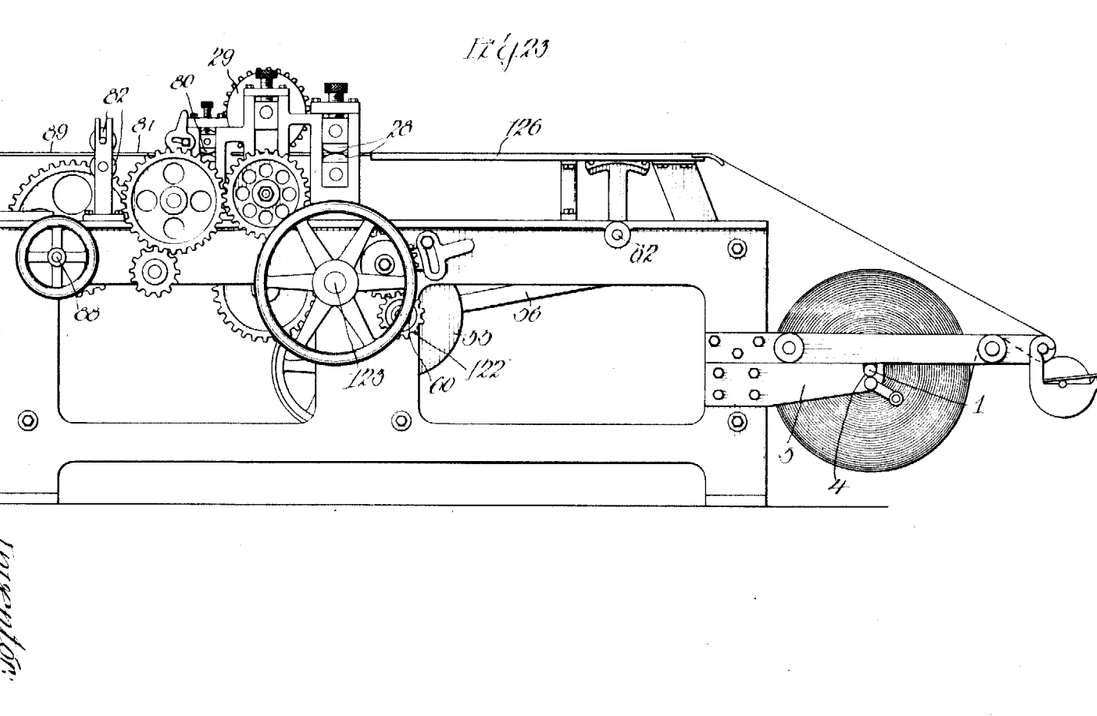

In Fig. —22— I have illustrated the bag as having the longitudinally overlapped edges of the blank forming the rectangular wall, and in Fig. —23— I have illustrated the machine fragmentarily to the extent necessary to indicate the changes in construction necessary to produce the bag of Fig. —22—, such changes consisting practically entirely in transposing the relative positions of certain parts of the machine.

From the foregoing it will be seen that the bags are produced without waste of a particle of paper except at the ends of the web, which is inappreciable and of no consequence whatsoever. It will also be noted that the bags produced are practically envelops suitable, particularly, for mailing second-class matter, which may be adapted for mailing first-class matter by applying adhesive to the tongues or flaps F thereof.

The machine comprises a suitable frame which is provided at one end with a rotatable support for a roll of paper from which the bags are adapted to be made, said support comprising the shaft 1 provided with cones 2 and 3. The cone 3 has a threaded engagement with said shaft 1 and the cone 2 is provided with a split clamp-collar, both said cones being adapted to be adjusted to engage rolls of paper of different widths midway between the ends of said shaft. The said shaft 1 is removably supported in bearings 4 at the outer ends of brackets 5 secured to the side members of the frame, and is adjustable longitudinally relatively to said bearings for properly positioning the roll relatively to the side members of the frame and the bag-making mechanism.

Above the supports 5 for the shaft 1 the frame of the machine is provided with brackets 7 having arms 8 upon which a receptacle 9 for paste is supported. The end walls of said receptacle are provided with recesses in which the shaft 10 of a paste-applying disk 11 is rotatable. Said shaft is held in said recesses by means of the flat springs 12 bearing thereon, said springs being suitably secured at one end to projecting 13 on the end walls of said receptacle 9 and bearing between their ends on said shaft 10.

In the brackets 7 the shaft of an idle roll 14 is suitably rotatably supported and at the outer end of the bracket 7 there is also rotatably supported the shaft of an idle roll 15. The web of paper is trained over said idle roll 14 and passes between the idle roll 15 and disk 11 as it is trained over the idle roll 15 whence said paper passes underneath a guide-plate 16 mounted between the side members of the frame, as more particularly illustrated in Fig. 12. Said plate 16 is supported between the extension members 18 mounted upon the side members of the machine frame and which are equipped with cross-bars 19 from which the supports 20 for said plate 16 depend, said members 20 being rigidly secured to the top of the plate 16 and to the lower faces of the cross-bars 19.

Figures 4, 9, 10, 12:
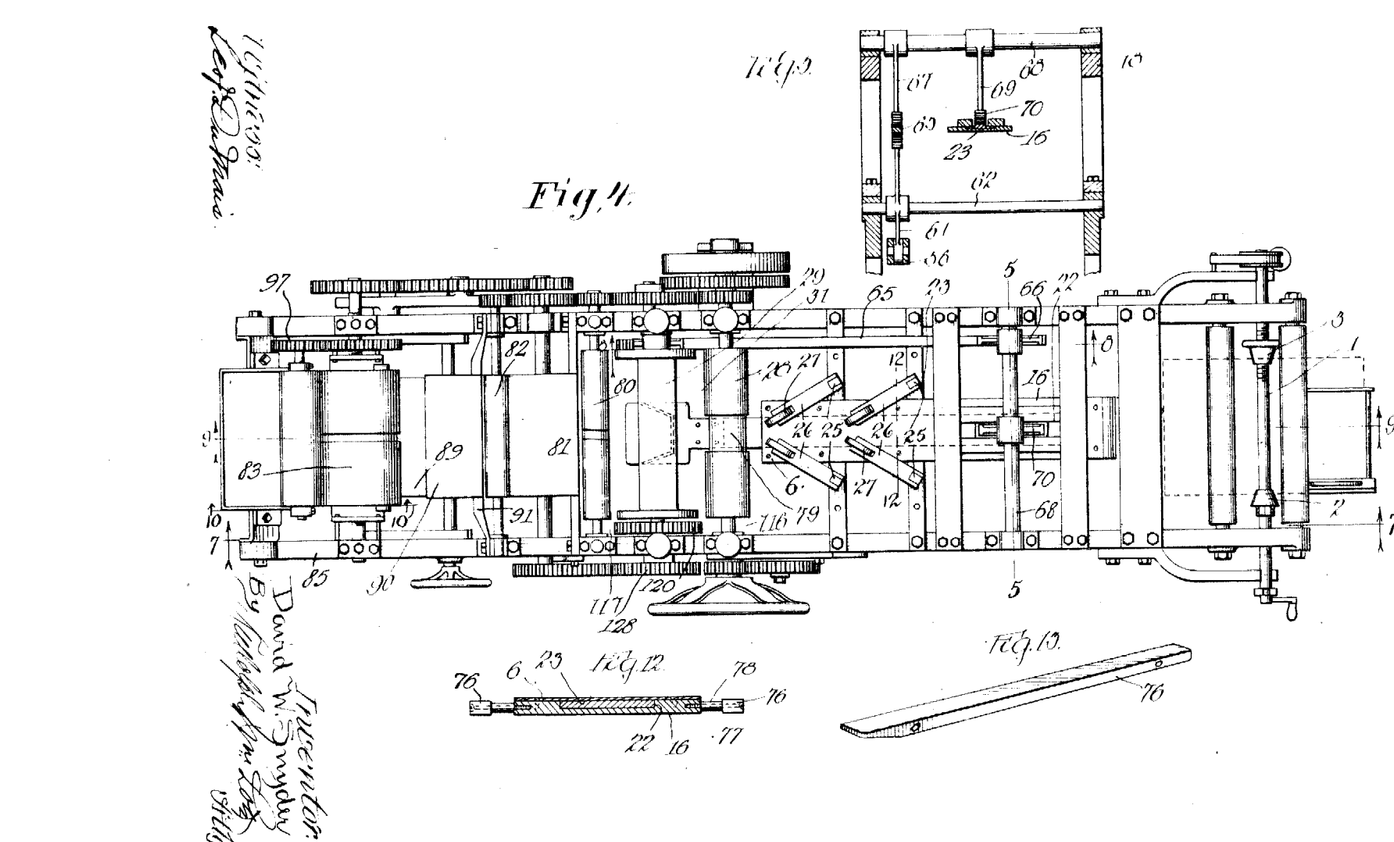

The members 20 are connected with each other by means that may be termed shoes 21 which overhang a guide-groove 22 in the plate 16 in which a reciprocable plunger 23 is received and guided. The said guide-groove 22 extends throughout the length of the plate 16 and is covered in part by a plate 6 of greater width than the guide-groove 22 as shown in Fig. —12—.

Mounted upon cross-pieces 24 mounted on standards secured to the upper faces of the side members of the frame of the machine are standards 25, to the upper ends of which are pivotally secured, the latter being provided in their free ends with rollers 27, which rest upon the plate 6, said arms 26 extending angularly to project over said plate 6. Said rollers 27 are positioned to rotate on axes perpendicular to the direction of extension of said arms 26.

As previously stated the web of paper passes underneath the said plate 16 and is folded over the side edges of the same so that the side edges of the web become overlapped substantially midway between the side edges of said plate 16, the said rollers 27 serving to cause the paper to be folded down so that the edges thereof overlap each other. Said overlapping edges are subsequently pressed down upon each other by the companion rolls 28 disposed between the inner end of the plate 16 and companion cutter rolls 29 and 30, which will be hereinafter more particularly described.

The said plunger 23 projects beyond the inner end of the plate 16 and carries at said inner end a cutter-die member 31 which passes between the said cutter rolls 29 and 30 in synchronism with cutters carried by said rolls for almost completely severing the tubular web to cut the same into predetermined lengths in such manner as to provide bottom flaps and closure flaps, the former of which is adapted to be folded over after having adhesive applied thereto for closing the bottom of the bag as hereinbefore set forth.

Figure 16:
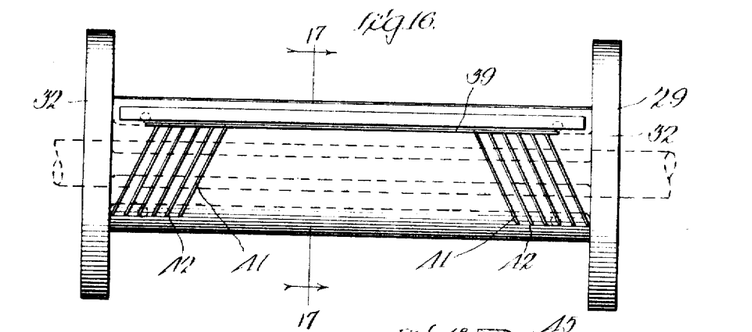
Figures 17, 18:
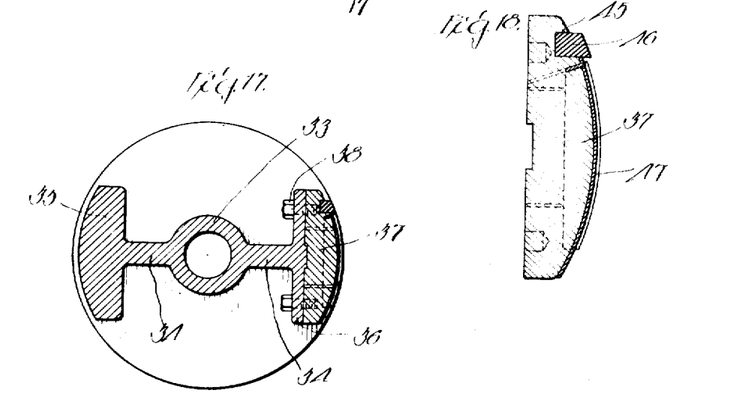
Figure 19:
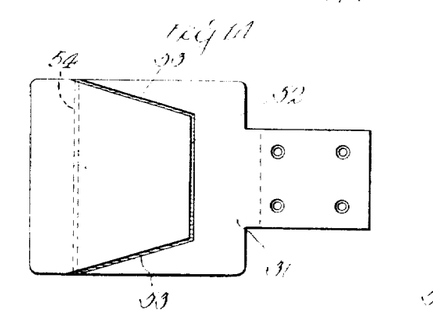
Figure 20:
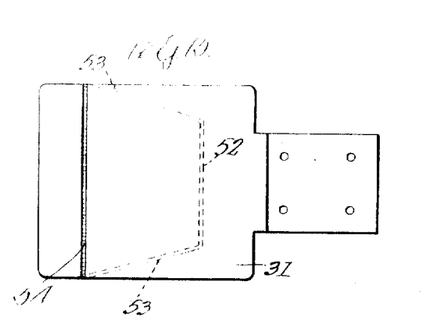
Figure 21:
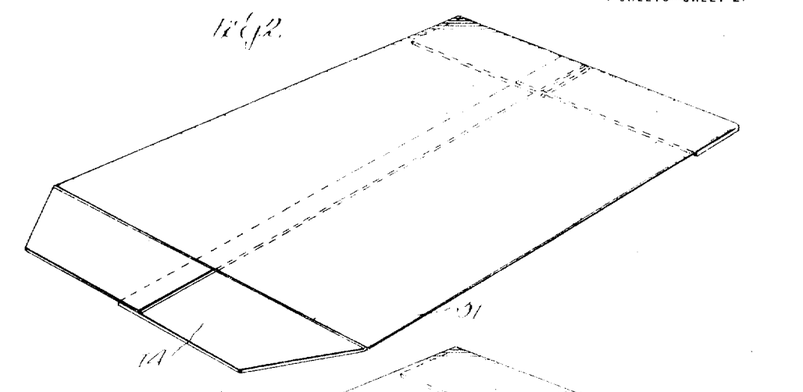

The cutter roll 29 is more particularly illustrated in Figs. —16— and —17—, and comprises end disks 32 connected together by means of a hollow hub portion 33 having diametrically oppositely disposed ribs 34, one of which terminates in what may be termed a counterweight shoe 35, and the other of which terminates in a cross-head 36 to which cutter blocks 37 are adapted to be secured by means of set-screws 38. The bag-severing mechanism constitutes a very important feature of the invention inasmuch as it is so constructed as to be adjustable for producing bags varying greatly in width without requiring any change or adjustment of the balance of the mechanism, that is to say, the said cutter mechanism, together with the plate 16 is adjustable to produce bags of a great variety of widths, but of equal length, and the other mechanism of the machine is, as will be hereinafter more particularly described, adjustable or variable to produce bags of a great variety of lengths regardless of width so that this one machine may be used to produce bags of one hundred twenty-one different sizes, this being, it is believed, entirely novel in the art and, therefore, constituting a very essential feature of the invention inasmuch as it obviates the installation in a bag manufacturing establishment of a large number of machines for producing bags of different sizes. In the instance illustrated, the machine is capable of producing bags of eleven different widths and eleven different lengths, this number being capable of variation if desired to produce a greater or lesser number of sizes in accordance with the requirements of the establishment in which the machine is installed.

The machine illustrated in Figs. —3— to —21— inclusive is adapted to produce paper bags such as are shown in Figs. —1— and —2— in which the web of paper, as previously stated, passes underneath the plate 16 and is severed to produce the loose closure flap at one end of the top wall of the flat tube produced by folding over and pasting together the overlapping edges of the bed, whereas the bag shown in Fig. —22— is adapted to be produced on the machine shown in Fig. —23— in which the web passes primarily over the top of the plate corresponding to the plate 16, and the severance is effected along the bottom wall of the flat tube produced, all of this being hereinafter more particularly described.

The cutter for severing the top wall of the flat tube is shown in face view in Fig. —16—, said face being convex and concentric with the axis of rotation of the roll 29 and being equipped with a longitudinal groove 39 adapted to receive a cutter blade 40 such as is shown in Fig. —19—, said cutter blade 40 being adapted to be driven into said groove and frictionally held therein. Communicating with the said groove 39 are a plurality of pairs of grooves 41 and 42, etc., which are adapted to receive knives 43, shown in Fig. —20— which are similarly driven into said grooves and frictionally held therein. The knives 40 vary in length to correspond with the distance separating the grooves of the pair 41 and 42, etc., respectively, and, together with the knives 43, form what may be termed triple edge cutters for severing the wall of the flat tube transversely for less than its entire width, and divergently from the ends of the transverse cut to the folded side edges of the tube, the width of the latter corresponding to the distance separating the most widely separated ends of the respective pairs of grooves 41, 42, etc., thereby producing the open and bag-closure flaps, shown in Figs. —1— and —2—. The said blocks 37, which are interchangeable for producing bags of various widths, are also provided with longitudinal grooves 45 extending parallel with and continuous to the grooves 39, and in which the rubber ribs or blocks 46 are adapted to be mounted. The face of the block 37 is also equipped with a rubber blanket 47 through which the cutting edges of the knives 40 and 43 project.

The roll 30 is constructed similarly to the roll 29 and is adapted to receive a block 48 similar to the block 37, which is provided with the removable rubber rib 49 and with a longitudinal cutting blade 50, similar to the blade 40 for transversely severing the lower wall of the flat tubular bag simultaneously with the severance of the upper wall of the latter to provide the open edge 51 over which the closure flap is adapted to be folded.

The rubber blocks or ribs 46 and 49 perform an important function in that they exert a yielding pressure on the paper and frictionally engage the same contiguous to the cutting knives 40 and 50 and their companion grooves in the plunger head 31 and serve to prevent the edges of the knives from drawing the paper down into the grooves and thus merely creasing it instead of perforating it. I have found in practice that unless these rubber members are employed the perforating of the paper is not so successfully accomplished.

In this machine the closure flap for one bag is, as hereinafter described, cut out of a wall of the next succeeding bag so that the latter must be folded along a transverse line between the ends of the three-sided recess cut into one wall thereof to provide a closure for said end of the bag, this being more particularly illustrated in Figs. —1— and —2—.

It will be seen by reference to Fig. —9— that the blocks 37 and 48 become opposed to each other once during each revolution of the rolls 29 and 30, and that the transverse cutting knives 40 and 50 are relatively positioned to sever the respective top and bottom walls of the flat tube at such a distance from each other as will provide the straight edge 51 at the open mouth of the bag and the parallel straight edge of the flaps 44. The knives 40 and 43 project into the grooves 52 and 53 respectively, in the upper face of the plunger head 31 and the knife 50 projects into the transverse groove 54 in the lower face of said plunger head 31, said grooves being shown in detail in Figs. —14— and —15—. All of the knives are provided with serrated edges whereby they will produce a great number of relatively short draw cuts whereby the severance will be along substantially straight smooth lines, though not quite as smooth as would be produced by a perfectly straight-edged knife. The said knives do not effect complete severance but leave mere shreds of stock which are easily torn to effect complete severance as hereinafter described.

Figure 8:
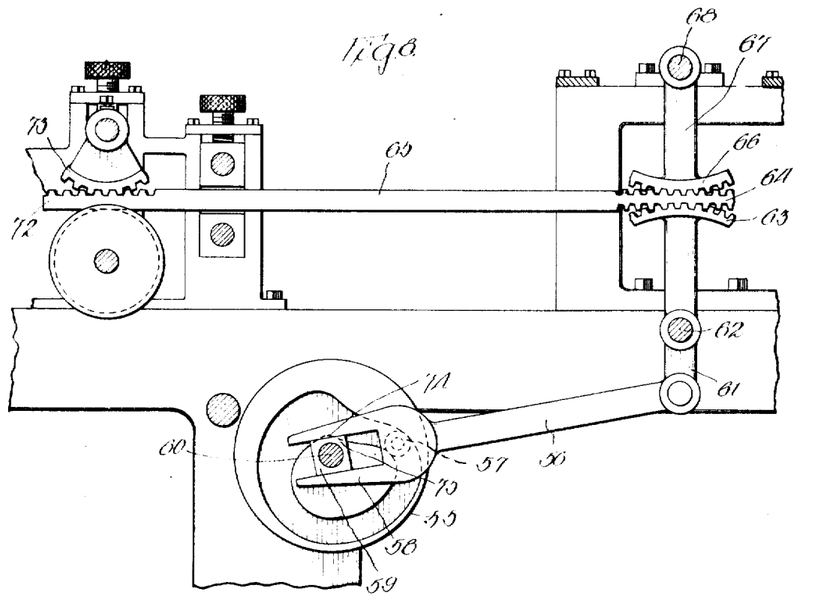
Figure 9:
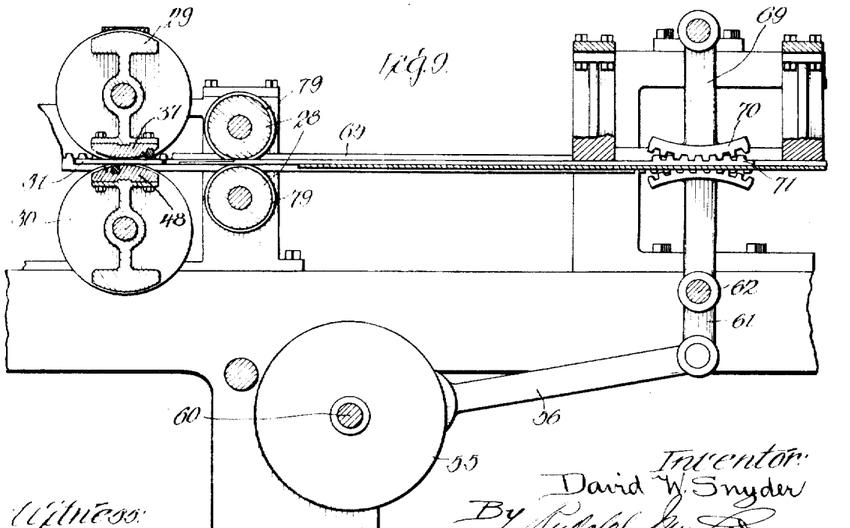
Figure 10:
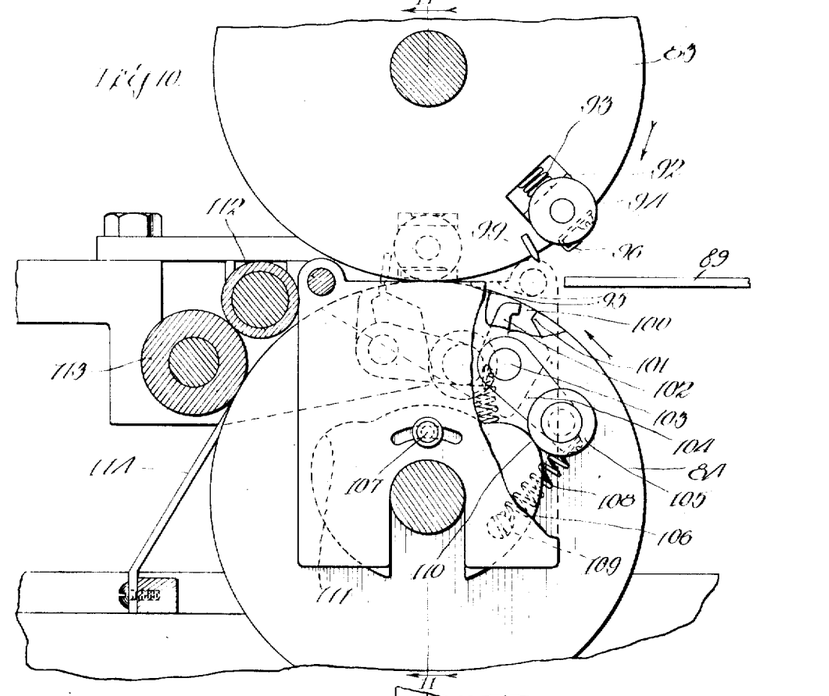

The said plunger 23 is reciprocated in synchronism with the rotation of the rolls 29 and 30 so that said plunger-head 31 becomes disposed to register with the cutter knives 40, 43 and 50 at proper relative intervals, this reciprocation being accomplished as hereinafter explained partly by the roll 29 and partly by means of a cam 55, particularly illustrated in Fig. —8—. It will be noticed that the said cam 55 is a groove cam which actuates a rod 56 equipped with an anti-friction roller 57 engaging in the groove of said cam, said plunger being provided with a bifurcated end portion 58 engaging a block 59 on the shaft 60 carrying said cam, said plunger being guided in its reciprocable movements by said block. The other end of said plunger 56 is pivotally connected with the lower end of a lever 61 pivotally mounted between its ends on a stud or shaft 62 carried by one of the side members of the frame, and which is equipped at its other end with a segmental rack 63 engaging in the rack 64 at one end of a plunger 65. The said rack 64 is a double rack in the upper portion of which a segmental rack 66 engages which is disposed at the lower end of an arm 67 mounted on a rock shaft 68 journaled in bearings disposed between the cross-bars 19, and which carries a similar arm 69 between its ends provided with a segmental arm 70 engaging in the rack 71 at that end of the plunger 23 which is disposed between the aforesaid ribs or connecting members 21 so that the said plunger 23 will be reciprocated conjointly with the plunger 65. The latter is equipped at its other end with a rack 72 in which a segmental gear 73 on the shaft of the roller 29 engages. The said cam 55 and segmental gear 73 coact to cause the plunger-head 31 to pass between the cutter rolls in synchronism with the cutting knives becoming opposed to each other in such a manner as to produce a very smooth and gradual reciprocation of said plunger as opposed to a jerky or sudden reciprocable movement thereof, this being accomplished as I will now described.

It will be noted that the inner wall of the groove of the cam 55 is provided with a projecting point 74, and that the surface 75 of said wall extending from said point 74 toward the anti-friction roller is nearest to the axis of rotation of the cam. Hence, as said surface 75 engages the said roller 57, the lever 61 will have swung to one limit of its movement at which the plunger 65 and the plunger-head 31 will be at the rearward limit of their movement. As the roller 57 rides over said point 74 the said lever 61 will obviously be moved partially toward the forward limit of its movement and at the moment of riding over said point will have attained a speed of movement equal to that which is imparted thereto by the segmental gear 73, the latter being, just previous to this time, out of mesh with said rack 72, but coming into mesh with the same at the moment that said roller 57 rides over said point 74. It will further be noted that that portion of the cam groove radially opposed to said point 74 is of greater width than the balance of said groove, and that said enlarged portion of said groove tapers gradually so that the roller 57 has considerable play therein. Accordingly, said roller may be moved radially away from the inner wall of the cam groove, and as said rack 72 is engaged by said segmental gear 73, said roller 57 will be moved out of contact with the walls of the cam groove so that said plunger 65 will be moved through the balance of its forward stroke by the segmental gear 73 to the exclusion of the groove of the cam 55. As the forward movement of the plunger 65 is completed, however, the segmental gear 73 passes out of mesh with the rack 72 and at the same instant the roller 57 enters the narrowest portion of the cam groove whereupon the plungers 56 will be moved by the cam to return the plunger 65 to the rearward limit of its movement. This arrangement is such that the plunger 65 is at no time free from engagement with either the segmental gear 73 or the narrowest portion of the cam groove.

The cam 55 is so constructed that it will answer for any size of bag made by the machine, that is to say, the cam and the segmental gear 73 together control the movements of the plunger 65 and said plunger 23 so that for different sized bags it is not necessary to change the cam 55 as the latter accomplishes only the return stroke of the plunger 65 and a very small portion of its forward stroke, the balance of which is controlled exclusively by the segmental gear 73. This is a very important feature of the invention, as will be obvious.

As previously stated, the cutter blocks 37 and 48, as well as the plunger heads 31 are interchangeable for bags of different widths, and similarly the plate 16 is adjusted in width by making the side portions 76 thereof removable and interchangeable, as more particularly shown in Figs. —12— and —13—. As shown in Fig. —12—, the plate 16 is adapted for the production of bags of smallest width for which the machine is adapted. As the width of these bags is increased, the width of the plate 16 is similarly increased by adding side rails 76 which are secured to the side edges of the plate 16 by means of set-screws 77 which may be of various lengths, and are adapted to receive separator sleeves 78 for spacing the bars or shoes 76 therefrom for the production of bags of any desired width within the limits of the capacity of the machine.

As previously stated, the machine herein illustrated is adapted to produce bags of eleven different widths, and it will be seen that the block 37, shown in Fig. —16— is provided with grooves 41 and 42, etc., for the production of five different widths. This block is particularly adapted to produce the bags of greatest width. Another similar block provided with six pairs of said grooves 41 and 42, the outermost pair of which would be disposed midway between the two outermost pairs of the grooves 41, 42, etc., of the block 37, will be mounted in place of the latter, and will produce bags of a width almost as great as the block 37 and down to the bag of least width which the machine is adapted to produce. Thus by mounting the cutter block 37 in the roller 29 and adjusting the width of the plate 16 and interchanging the plunger head 31, bags of any desired width may be produced, these being the controlling elements for the width of such bags.

The length of the bags is controlled by the diameters of the companion rolls 28 and the companion rolls 29 and 30, and other rolls which I will hereinafter describe. Thus to produce eleven different lengths of bags the machine must be provided with a corresponding number of the various rolls for feeding the tube longitudinally corresponding to the number of variations in length, and this may obviously be increased or diminished as desired. It will further be obvious that the length of the flap for closing the normally open end of the bag will be the same for all bags regardless of length or width, but this may be varied by providing a greater number of pairs of companion blocks 37 and 48 in which the knives 40 and 50 are spaced to cut the tube a greater or less distance apart than is shown in Fig. —6—.

Having now shown how the web is first fed into the machine and folded over to produce a flat tube, and how said tube is severed into bag lengths, I will proceed to describe the remaining operations and mechanisms for completing the bags.

It will be observed, of course, that the upper of the rolls 28 is equipped midway between its ends with an annular groove 79 for receiving the portion of the plunger 23 which passes between said rolls. The bottom wall of this groove 79 bears upon the overlapped edges of the web for causing the same to adhere to each other and, after severance of the flat tube now formed, the same passes between a pair of presser rolls 80 where the overlapped portions of the tube are further pressed down upon each other, and the side edges of said tube are sharply creased or folded. This flattened tube then passes over the plate 81 and between a pair of idle rolls 82 having the same surface speed as the portion of the rolls 28 engaging the tube, and as the convex surfaces of the cutter blocks and the presser rolls 80. After passing between the rolls 82 the partially severed bag length or blank passes between the pair of rolls 83 and 84 which effect the application of adhesive paste to the bag-body for securing the bottom flap of the bag, and fold the latter over preparatory to completion and delivery of the bag from the machine. It will be noted that the said rolls 83 and 84 are mounted in a carriage 85 (Fig. 7) equipped with racks 86 which meshed with spur pinions 87 on a manually operable shaft 88 by means of which said carriage is moved toward and from the rolls 82, according to the length of the bag to be produced, that is to say, if the bag is of short length, the carriage 8 is moved toward the rolls 82, and as the length of the bag increases, it is moved away from said rolls. The purpose of this is to prevent more than one partially severed bag blank being disposed between the rolls 82 and the rolls 83 and 84 at the same time.

Figure 11:
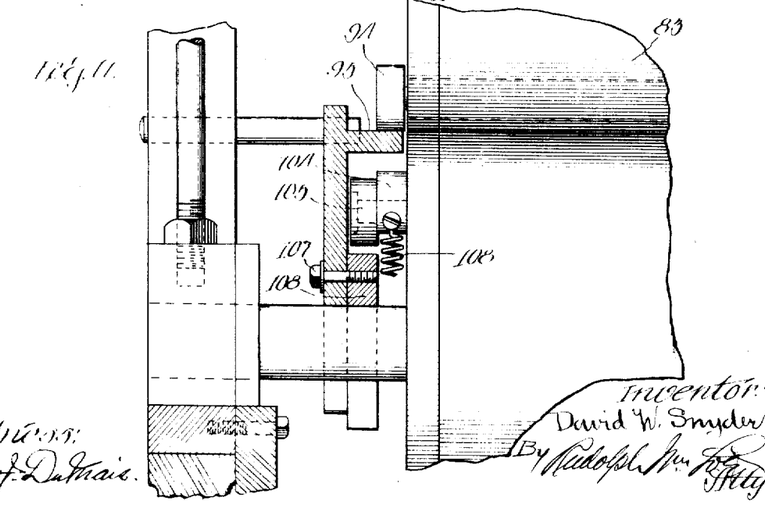

The said rolls 83 and 84 rotate at a higher surface speed than the rolls 82 so that as the bag is engaged between said rolls it will be moved at so much higher speed than the balance of the tube as to effect a final severance of the latter and separation of the severed bag blank from the body of the tube, as will be obvious. These rolls 83 and 84 are shown in detail in Figs. —10— and —11— from which the operation will be more easily understood. The bag is, prior to engagement between said rolls 83 and 84, passed over the plate 89 which consists of two telescopically interfitting portions, as will be apparent from Fig. —4—, and comprises the hollow portion 90 in which the plate portion 89 is received. The latter is manually movable relatively to the tubular portion which is rigidly secured to a cross-bar 91 mounted upon the side members of the frame of the machine.

Figure 7:
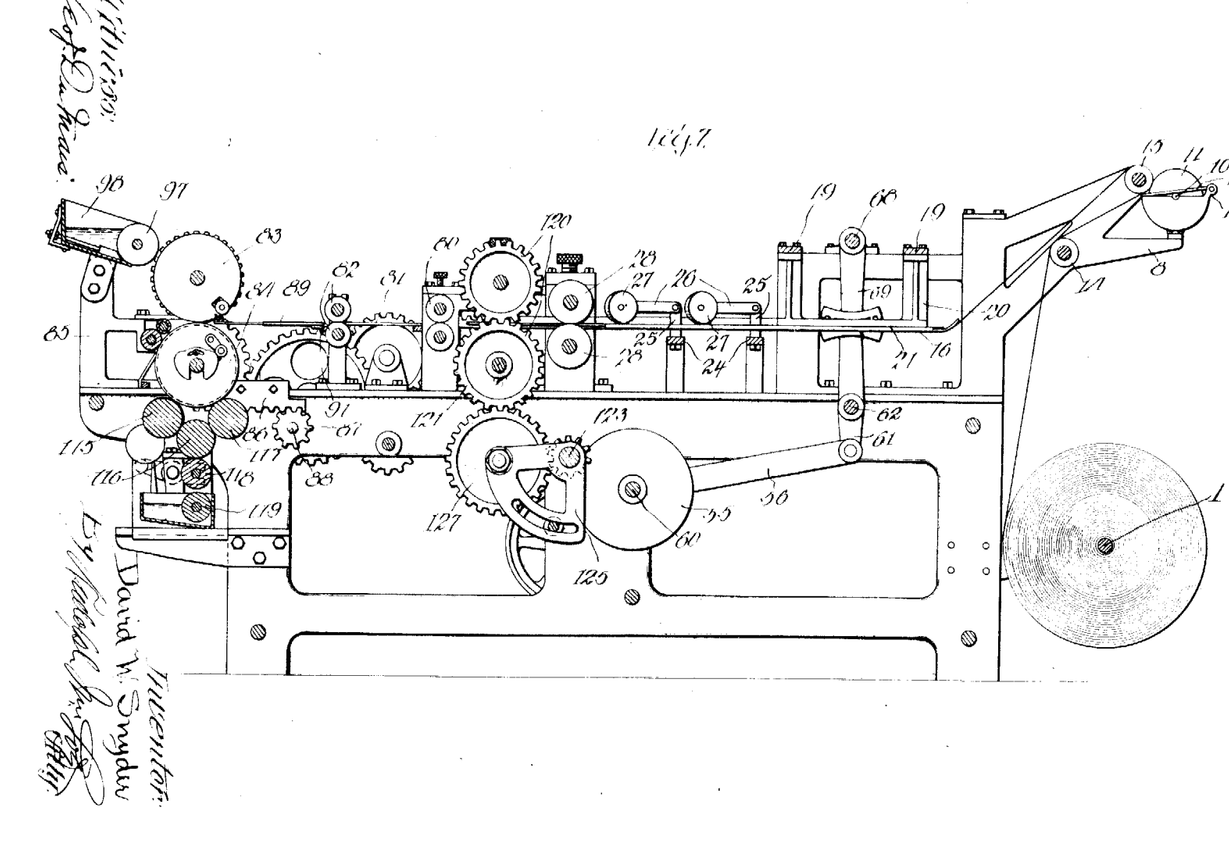

The roller 83 is provided with a radially reciprocable plunger 92 mounted in a longitudinal groove therein and held normally at the outer limit of its movement by means of springs 93. This plunger is provided at its ends with trunnions on which anti-friction rollers 94 are mounted, which are adapted to engage cam surfaces 95 to effect a repression of said plungers into their grooves as the latter become opposed to the surface of the roll 84. The said plunger 92 carries a paste-applying member 96 which presents a surface for applying the strip of paste to the bag blank, as hereinbefore mentioned, preparatory to folding the lower end portion of the blank over upon the latter. This paste-applying member 96 contacts with the roller 97 disposed at the mouth of a paste receptacle 98, which is maintained out of contact with the surface of the roll 83, but in engaging relation to said member 96, as will be obvious. Mounted in a longitudinal groove in the roller 83 parallel with and contiguous to the groove in which the plunger 92 is mounted is a projecting knife edge 99 which becomes opposed to an opening 100 extending longitudinally of the roller 84, and into which it projects, thereby pressing the portion of the bag body which said member 99 engages into said opening 100. Said opening is provided with a rigid wall 101 and an opposed movable member or creasing and gripping jaw 102. This portion of the bag body is adapted to be clamped between said jaw 102 and wall 101 immediately following its projection into the opening 100 by said member 99. The jaw member 102 is carried by a shaft 103 mounted in the roller 84 parallel with the axis of rotation thereof, and which is equipped at one end with an arm 104 carrying an anti-friction roller 105. The latter is adapted to ride upon a cam member 106 held rigid with the frame of the machine by means of a clamping bolt 107, and which is adapted to be adjusted to a limited extent through an arc concentric with the shaft of said roll 84. The said arm 104 is engaged at its outer end by a helical tension spring 108, the other end of which is engaged with a set-screw 109 mounted in the end of the roller 84, and which serves to hold the said roller normally in engagement with the surface of said cam 106. The latter is provided with two peripheral portions 110 and 111 respectively, which are disposed radially farthest removed from the axis of rotation of the roll 84, and which, when engaged by the anti-friction roller 105, are adapted to effect a separation of the face of the jaw member 102 from its opposed surface 101, thus providing the opening 100 therebetween in which the folded portion of the bag body is received. After the bag body has been received in said opening 100 the said roller 105 rides free of the surface of the cam 106, and said opening thereupon becomes closed by the action of the spring 108 thus pinching and creasing the bag body therein and securing such a firm grip thereon as will effect a severance of this portion of the tube from the remainder thereof. The cutting knives do not, as aforesaid, effect total severance, but merely such perforation as will effect an almost complete severance. The bag is carried by the roll 84 so that it becomes engaged between the surface of the latter and the rolls 112 and 113 which cause the flap to become firmly pressed down upon the bag body to effect adhesion between said parts, thus closing the bottom of the bag body. As the anti-friction roller 105 engages the cam surface 111 the jaw member 102 is moved to again assume the position shown in full lines in Fig. —7—, thereby obviously releasing the bag body which is thereupon delivered over the scraper member 114.

The rollers 83 and 84 may also be utilized as printing elements for printing any desired matter on the bags as they pass between said rollers. Thus the roller 84 may carry type and plates and the roller 83 may constitute the tympan cylinder of the printing means. The type and plates on the cylinder 84 will be inked by means of a series of inking rolls 115, 116, 117, 118 and 119 in the usual manner common to printing presses. Thus the machine may perform the functions of a bag-making and bag-printing machine substantially simultaneously.

As previously stated, certain of the rollers and gears are interchangeable for producing bags of varying lengths, and certain of the spur-gears must, therefore, be similarly interchanged for controlling speeds as required. The rollers 83 and 84 rotate constantly at the same speed and always at greater surface speed than any of the other rollers in order to effect severance of bag-blanks from the tubular body. As this severance is effected a separation also takes place which increases in degree as the bags decrease in length.

The largest diameter rolls 29 and 30 for cutting the tube into blanks of maximum length are driven by gears 120 and 121 having a pitch diameter slightly less than the diameter of the rollers 83 and 84 and are geared to rotate at the same number of revolutions per minute as the latter. As smaller diameter rolls 29 and 30 are substituted to produce shorter bags, the pitch-diameter of the gears 120 and 121 also decreases but the number of revolutions per minute remains the same. This is effected by driving the roll 30 from the gear 127, and mounting on the shaft of said roll a gear 128 which is geared by a train of gears to the roll 84 to drive the latter at the same number of revolutions per minute. Obviously the cam 55 must rotate at the same number of revolutions per minute as the gears 120 and 121 and, therefore, the gear 122 is interchanged simultaneously with the gears 120 and 121 with which it accords in pitch diameter. The rolls 28, 80 and 82 and their drive gears are similarly interchanged so that their surface speeds will coincide with that of the convex surfaces of the plates 37 and 48 of the rolls 29 and 30. Certain of the permanent gears on the frame of the machine are mounted on studs on adjustable members exemplified by the member 125 whereby the same may be properly positioned to mesh with interchangeable gears of varying diameters.

Briefly stated the operation is as follows:
The web of paper first passes over a roll for applying adhesive along one side edge thereof and the opposite side edge portions are then folded to overlap each other to form a continuous flat tube. This tube then passes between the perforating rolls and the contained coacting grooved plunger 31 whereby the opposite side walls of the bar are cut to form the flap at one end of the same and the recess of corresponding shape in the opposite end of the other wall of the bag. The tube then passes between pairs of presser rolls and then between the rolls 83 and 84 by means of which adhesive is applied to the recessed wall and whereby the recessed lower end portion of the back is folded over to close the tube at one end.

The rollers 83 and 84, by reason of their higher surface speed than the next preceding pair of presser rolls, also serve to sever the blank on which they are operating from the tube body along the lines of the aforesaid perforations.

In Fig. —23— I have illustrated a machine corresponding with that of Figs. —3— to —21— inclusive in construction and operation, but in which those parts of the mechanism disposed above the plate 16 in the machine of Figs. —3— to —21— inclusive, are disposed below the plate 126 of the machine illustrated in Fig. —23—, these parts including the gear segments for actuating the parts of the latter corresponding to the plungers 23 and 65. The operations are identical in every way with those performed by the machine of Figs. —3— to —21— inclusive, the web of paper being folded to have its edges overlap below the said plate 126 instead of above the same. This machine is adapted to produce the bag shown in Fig. —22— which does not differ in any material respect from the bag shown in Fig. —2—.

I claim as my invention:

1. In a machine of the kind specified, the combination with mechanism for folding and applying adhesive to a web of paper to produce a flat tube, of a pair of rotatable members equipped with cutters for cutting the opposite walls of the tube, a plunger mounted to reciprocate within the tube and to pass between said rotatable members at intervals for causing grooves in the opposite faces of said plunger to become positioned to receive the cutter edges as the same penetrate the walls of the tube, and mechanism for reciprocating said plunger.

2. In a machine of the kind specified, the combination with mechanism for folding and applying adhesive to a web of paper to produce a flat tube, of a pair of rotatable members equipped with cutters for cutting the opposite walls of the tube, a plunger mounted to reciprocate within the tube and to pass between said rotatable members at intervals for causing grooves in the opposite faces of said plunger to become positioned to receive the cutter edges as the same penetrate the walls of the tube, means geared to said rotatable members for causing said plunger to move into position between the latter, and mechanism for returning said plunger to its normal position.

3. In a machine of the kind specified, the combination with mechanism for folding and applying adhesive to a web of paper to produce a flat tube, of mechanism for cutting said tube into predetermined lengths comprising a pair of rotatable members each provided with cutters for cutting opposite walls of the flat tube simultaneously, and a reciprocable member housed by said tube, and gearing between said reciprocable member and said rotatable members for causing the former to pass between said rotatable members at intervals to effect register of recesses in said reciprocable member with the cutters of said rotatable members.

4. In a machine of the kind specified, the combination with mechanism for folding and applying adhesive to a web of paper to produce a flat tube, of mechanism for cutting opposite walls of the flat tube into bag-blanks of predetermined length, said mechanism comprising cutters disposed on opposite sides of the path of travel of the tube, mechanism for moving the same at intervals toward said tube to penetrate the walls of the latter, and a companion reciprocable member within the tube constituting a female cutter member adapted to coact with said cutters to effect severance of the tube, and gearing between said cutters and said reciprocable member for moving the coacting cutting means synchronously into register with each other.

5. In a machine of the kind specified, the combination with mechanism for continuously moving a web of paper longitudinally, applying adhesive to the same contiguous to one side edge thereof, and folding the said web to cause the side edges thereof to overlap and adhere together to form a flat tube, of mechanism for cutting said tube into bag-blanks of predetermined length including two members carrying cutters for penetrating opposite walls of the flat tube simultaneously at predetermined intervals, a reciprocable member inclosed within the flat tube and provided with grooves adapted to receive the edges of the cutters, and gearing between the said cutter carrying members and said reciprocable member for moving the latter into register with said cutters at proper intervals.

6. In a machine of the kind specified, the combination with mechanism for continuously moving a web of paper longitudinally, applying adhesive to the same contiguous to one side edge thereof, and folding the said web to cause the side edges thereof to overlap and adhere together to form a flat tube, of mechanism for cutting said tube into bag-blanks of predetermined length including two members carrying cutters for penetrating opposite walls of the flat tube simultaneously at predetermined intervals, a reciprocable member inclosed within the flat tube and provided with grooves adapted to receive the edges of the cutters, means carried by the cutter-carriers for effecting connection between the same and said reciprocable member for moving the latter into register with said cutters at proper intervals, and means for actuating said reciprocable member independently of said cutter-carriers for imparting reverse movement to said reciprocable member, 7. In a bag making machine, mechanism for cutting a flat paper tube into bag-blanks of predetermined length, including cutter-carriers disposed on opposite sides of the path of travel of the tube and operable to cause the cutters to penetrate opposite walls of the tube at predetermined intervals, and a reciprocable member disposed within the tube and having grooves adapted to receive the edges of said cutters, of mechanism for reciprocating said member including an element carried by one of said cutter carriers and adapted to be operatively engaged with said member at intervals to move the same into register with said cutters, and a member on another part of the frame of the machine adapted to be operatively engaged with said member at intervals alternating with the intervals of engagement thereof with said cutter carrier for imparting reverse movement to said member.

8. In a bag making machine, mechanism for cutting a flat paper tube into bag-blanks of predetermined length, including cutter carriers disposed on opposite sides of the path of travel of the tube and operable to cause the cutters to penetrate opposite walls of the tube at predetermined intervals, and a reciprocable member disposed within the tube and having grooves adapted to receive the edges of said cutters, of mechanism for reciprocating said member including a rack-bar rigid with said member, a gear-segment on one of said cutter-carriers adapted to mesh with said rack-bar for moving said member in one direction, and a cam operatively engaged with said member for moving the same into and out of engaging relation to said gear segment.

9. In a bag making machine, mechanism for cutting a flat paper tube into bag-blanks of varying predetermined lengths, including means for moving said flat tube continuously at a predetermined speed, coacting cutting elements disposed on opposite sides of the path of travel of and within the tube respectively, the last-named element reciprocable to be brought into and out of coacting relation to said cutting elements at regular intervals, said intervals variable as to time to vary the length of the bag-blanks cut from the tube, means for effecting operative engagement between the cutter-carriers and said reciprocable member for moving the same into coacting relation to said cutters, and a cam operatively engaged with said reciprocable member for throwing the same into and out of position for effecting operative engagement between the same and said cutter-carriers, said cam being out of effective engaging relation to said reciprocable member during the period of its effective operative engagement with said cutter carriers.

10. In a bag making machine, mechanism for cutting a flat paper tube into bag blanks of varying lengths comprising a pair of rotatable elements for moving the flat tube continuously at predetermined speed, cutters carried thereby and adapted to penetrate the walls of the flat tube at intervals during the rotation of said elements, a reciprocable member operatively disposed within the tube and having recesses adapted to register with said cutters and coact therewith to cut the opposite walls of the tube along respectively different lines, said elements of varying diameters interchangeable to vary the lengths of the bag-blanks, means carried by said elements for effecting operative engagement between the same and said reciprocable member for moving the same onto registering position relatively to said cutters, a rotatable cam associated with said reciprocable member for imparting reverse movement to the latter and throw the same into and out of operative relation to said elements, the latter varying the length of stroke of said reciprocable element in the ratio of the variation in diameter of said elements, the effective cam-surface for actuating said member being limited to an arc of less than three hundred sixty degrees, whereby said cam and said means for effecting operative engagement between said reciprocable member and said elements act independently of each other and alternately to impart movement to said member.

11. In a machine of the kind specified, the combination with mechanism for forming a continuous flat tube from a web of paper, and mechanism for cutting said tube into bag-blanks of predetermined length, including a reciprocable member movable within the tube and constituting a female cutting die, and interchangeable rotatable cutter elements disposed externally of the path of travel of said tube, said cutter elements being disposed at varying distances from the axes about which they rotate for varying the lengths of bag-blanks, of means associated with said cutter elements and adapted to operatively engage said reciprocable member to move the latter in one direction, a cam operatively engaged therewith for moving the same in the opposite direction, and interchangeable gearing for causing said cam to rotate at the same speed as said cutter elements, as the latter are interchanged, said cam including a portion inactive to impart movement to said member during the period of its effective engagement with said means associated with said cutter elements.

12. In a bag making machine, means for cutting a paper tube into bag-blanks of different lengths comprising interchangeable coacting cutting devices, means for engaging the same with each other at intervals to throw them into coacting cutting position, and a cam for throwing them out of said position, said means and said cam acting independently of each other and alternately with relation to each other.

13. In a bag making machine, means for cutting a paper tube into bag-blanks of different lengths comprising interchangeable coacting cutting devices, means for engaging the same with each other at intervals to throw them into coacting cutting position, and a cam for throwing them out of said position, said means and said cam acting independently of each other and alternately with relation to each other, said cam including a part adapted to impart initial movement to one of said cutting devices to position the same for operative engagement with the remainder thereof for continuing its movement thereby.

14. In a bag making machine, means for cutting a paper tube into bag-blanks of different lengths comprising interchangeable coacting cutting devices including a reciprocable member and a pair of rotatable members, the latter being varied in diameter in accordance with variations in length of bag-blanks cut thereby, means for operatively engaging said rotatable members with said reciprocable member for moving the latter in one direction, the stroke thereof in said direction being varied in direct ratio to the variation in diameter of said rotatable members, a single rotatable cam operatively engaged with said reciprocable member for moving the same in the opposite direction to a predetermined position, and coacting with the rotatable members of all diameters for which the machine is adapted, and interchangeable gearing for causing said cam to rotate at the same speed as the said rotatable members.

15. In a bag making machine, means for cutting a paper tube into bag-blanks of different lengths comprising interchangeable coacting cutting devices including a reciprocable member and a pair of rotatable members, the latter being varied in diameter in accordance with variations in length of bag-blanks cut thereby, means for operatively engaging said rotatable members with said reciprocable member for moving the latter in one direction, the stroke thereof in said direction being varied in direct ratio to the variation in diameter of said rotatable members, a single rotatable cam operatively engaged with said reciprocable member for moving the same in the opposite direction to a predetermined position, and coacting with the rotatable members of all diameters for which the machine is adapted, and interchangeable gearing for causing said cam to rotate at the same speed as the said rotatable members, said cam including a part adapted to impart initial movement to one of said cutting devices to position the same for operative engagement with the remainder thereof for continuing its movement thereby.

16. In a bag-making machine, the combination with means for producing flat tubes of different widths from webs of paper, of mechanism for severing opposite walls of said tube along predetermined lines including a cutting block provided with a single groove for receiving a cutting member for effecting a transverse cut in a wall of the tube of less width than the latter, and a plurality of pairs of divergent cutter-receiving grooves communicating at one end with the first-named groove between the ends of the latter and variously spaced to receive the cutters for severing said wall of the tubes of varying widths from the ends of the said transverse cut to the side edges thereof.

17. In a bag-making machine, the combination with mechanism for substantially simultaneously cutting opposite walls of a flat tube at predetermined points to partially sever the same for producing bag-blanks of predetermined length, of mechanism adapted to engage the forward end of the partially severed tube closing the same, said mechanism coacting with the mechanism for passing the tube through the machine at predetermined speed for severing said tube successively into the aforesaid predetermined lengths.

18. In a bag-making machine, the combination with mechanism for substantially simultaneously cutting opposite walls of a flat tube at predetermined points to partially sever the same for producing bag-blanks of predetermined length, and mechanism for effecting closure of the forward end of the tube for forming bag bottoms, of mechanism interposed between the cutting mechanism and the bottom-forming mechanism, and coacting with the latter to sever the tube successively at the aforesaid partially severed points.

19. In a bag-making machine, the combination with mechanism for cutting opposite walls of a flat tube at predetermined points to partially sever the same for producing bag-blanks of predetermined length, and mechanism engaging said flat tube to pass the same through the machine at predetermined speed, of a pair of rolls between which the partially severed portion of the tube is engaged for imparting higher speed thereto, whereby to completely sever the same and space the severed portion from the tube body, said rolls equipped with coacting formations for folding one end portion of the severed portion upon the body thereof to form a bag-bottom, a reciprocable adhesive applying member on one of said rolls for applying a strip of adhesive to the severed portion of the tube, means for feeding adhesive to said member, whereby when the latter is folded the bag will be completed.

20. In a bag-making machine, the combination with mechanism for cutting opposite walls of a flat tube at predetermined points to partially sever the same for producing bag-blanks of predetermined length, and mechanism engaging said flat tube to pass the same through the machine at predetermined speed, of a pair of rolls between which the partially severed portion of the tube is engaged for imparting higher speed thereto, whereby to completely sever the same and space the severed portion from the tube body, means associated with one of said rolls for applying adhesive to the body of the severed tube portion, there being a longitudinal recess in one of said rolls, a projection on the other thereof adapted to enter same for creasing the bag-body and projecting the creased portion into said recess, and a roll associated with said recessed roll for pressing the opposed creased portions upon each other to effect closure of the severed tube portion at one end.

21. In a bag-making machine, the combination with mechanism for cutting opposite walls of a flat tube at predetermined points to partially sever the same for producing bag-blanks of predetermined length, and mechanism engaging said flat tube to pass the same through the machine at predetermined speed, of a pair of rolls between which the partially severed portion of the tube is engaged for imparting higher speed thereto, whereby to completely sever the same and space the severed portion from the tube body, means associated with one of said rolls for applying adhesive to the body of the severed tube portion, there being a longitudinal recess in one of said rolls, a projection on the other thereof adapted to enter same for creasing the bag-body and projecting the creased portion into said recess, a vise disposed in said recess, a spring normally maintaining the same closed, said creased portion being adapted to be received in said vise, and a cam for maintaining said vise open during a part of the rotation of said roll, said cam adapted to permit closure of the said vise to grip the creased portion of the severed tube portion and firmly engage the same, and a presser roll associated with said last-named roll for pressing the creased portions of the tube blank together to effect closure of said tube portion at one end.

22. In a bag-making machine, the combination with mechanism for cutting opposite walls of a flat tube at predetermined points to partially sever the same for producing bag-blanks of predetermined length, and mechanism engaging said flat tube to pass the same through the machine at predetermined speed, of a pair of rolls between which the partially severed portion of the tube is engaged for imparting higher speed whereto, whereby to completely sever the same and space the severed portion from the tube body, means associated with one of said rolls for applying adhesive to the body of the severed tube portion, there being a longitudinal recess in one of said rolls, a projection on the other thereof adapted to enter same for creasing the bag-body and projecting the creased portion into said recess, a vise disposed in said recess, a spring normally maintaining the same closed, said creased portion being adapted to be received in said vise, and a cam for maintaining said vise open during a part of the rotation of said roll, said cam adapted to permit closure of the said vise to grip the creased portion of the severed tube portion and firmly engage the same, and a presser roll associated with said last-named roll for pressing the creased portions of the tube blank together to effect closure of said tube portion at one end, while the same is engaged by said vise.

23. In a bag-making machine, the combination with mechanism for cutting opposite walls of a flat tube at predetermined points to partially sever the same for producing bag-blanks of predetermined length, and mechanism engaging said flat tube to pass the same through the machine at predetermined speed, of a pair of rolls between which the partially severed portion of the tube is engaged for imparting higher speed thereto, whereby to completely sever the same and space the severed portion from the tube body, means associated with one of said rolls for applying adhesive to the body of the severed tube portion, there being a longitudinal recess in one of said rolls, a projection on the other thereof adapted to enter same for creasing the bag-body and projecting the creased portion into said recess, a vise disposed in said recess, a spring normally maintaining the same closed, said creased portion being adapted to be received in said vise, and a cam for maintaining said vise open during a part of the rotation of said roll, said cam adapted to permit closure of the said vise to grip the creased portion of the severed tube portion and firmly engage the same, and a presser roll associated with said last-named roll for pressing the creased portions of the tube blank together to effect closure of said tube portion at one end, while the same is engaged by said vise, said cam adapted to effect reopening of said vise as the latter passes said presser roll.

24. In a machine of the kind specified, the combination with mechanism for partially severing bag-blanks from a continuous tube, of mechanism for effecting closure of one end of each blank to form a bag bottom therefor, said mechanism including a pair of opposed rolls between which the bag blanks are engaged, means associated with one of said rolls for applying adhesive to the blank, coacting folding mechanism on said rolls for creasing and folding the blank to effect closure of one end thereof, one of said rolls adapted to carry a printing plate and the other thereof adapted to constitute a tympan cylinder, and inking rolls associated with said roll adapted to carry said printing plate for inking the latter, whereby the bags are adapted to be printed substantially simultaneously with their completion.

25. In a machine of the kind specified adapted to make bags of varying lengths, the combination with mechanism for effecting partial severance of a continuous tube to form bag-blanks, a pair of rolls between which the partially severed blanks pass successively and are engaged, said rolls acting as retarding rolls, of a carriage movable toward and from said rolls, a pair of rolls on said carriage between which the successive bag-blanks are received, said rolls on said carriage having higher surface speed than said retarding rolls and adapted to effect final severance of bag-blanks successively from said tube, and mechanism associated with said rolls on said carriage for effecting closure of said bag-blanks at one end to complete the bags; said closure mechanism being adapted to be brought into proper relative position to said retarding rolls as the lengths of bag blanks are varied to engage the bag-blanks at predetermined points between their ends for effecting proper closure thereof.

In testimony whereof I have signed my name in presence of two subscribing witnesses.

DAVID W. SNYDER.

Witnesses:
M. M. BOYLE,
G. M. NEVILLE.